(12) United States Patent
Briggs

(10) Patent No.: US 8,179,794 B2
(45) Date of Patent: *May 15, 2012

(54) METHODS, SYSTEMS, AND COMPUTER PROGRAM PRODUCTS FOR PROVIDING QUALITY OF SERVICE BROKERING IN A NETWORK

(75) Inventor: Christopher Briggs, Douglasville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/486,239

(22) Filed: Jun. 17, 2009

(65) Prior Publication Data

US 2009/0252034 A1 Oct. 8, 2009

Related U.S. Application Data

(63) Continuation of application No. 11/251,220, filed on Oct. 14, 2005, now Pat. No. 7,564,787.

(51) Int. Cl.
*H04J 1/16* (2006.01)

(52) U.S. Cl. ....................................................... 370/230
(58) Field of Classification Search .................. 370/230, 370/229, 230.1, 231, 235, 236, 282, 352, 370/353, 356, 368, 371, 378, 389, 401, 471, 370/902, 395.52, 395.71

See application file for complete search history.

(56) References Cited

U.S. PATENT DOCUMENTS

| | | |
|---|---|---|
| 6,775,280 B1 | 8/2004 | Ma et al. |
| 6,952,728 B1 | 10/2005 | Alles et al. |
| 7,564,787 B2 * | 7/2009 | Briggs .......................... 370/230 |
| 2006/0002404 A1 | 1/2006 | Igarashi |

* cited by examiner

*Primary Examiner* — Chi Pham
*Assistant Examiner* — Alexander Boakye
(74) *Attorney, Agent, or Firm* — Cantor Colburn LLP

(57) ABSTRACT

Exemplary embodiments relate to methods, systems, and computer program products for providing quality of service brokering in a network. Methods include receiving a data packet at a router in an Internet protocol (IP) network. The data packet includes a data packet QoS class and a data packet destination. A storage mechanism that includes possible routes to the data packet destination at the data packet QoS class is accessed. One of the possible routes is selected. The data packet is transmitted along the selected route to the data packet destination.

20 Claims, 2 Drawing Sheets

METHODS, SYSTEMS, AND COMPUTER PROGRAM PRODUCTS FOR PROVIDING QUALITY OF SERVICE BROKERING IN A NETWORK

CROSS-REFERENCE TO RELATED APPLICATIONS

This application is a continuation of U.S. patent application Ser. No. 11/251,220 filed Oct. 14, 2005, the contents of which are incorporated herein by reference in their entirety.

BACKGROUND

Exemplary embodiments relate generally to networks, and more particularly, to methods, systems, and computer program products for providing quality of service brokering in a network.

Customers are increasingly asking service providers to manage computer connections from one geographic location to another and these computer connections often involve multiple carriers and multiple networks. When a customer requests a particular bandwidth for a particular quality of service (QoS) level, the service providers may have to negotiate with multiple carriers to provide the requested service. Typically, the service providers negotiate contracts on a case-by-case basis with each carrier and mark the traffic according to the negotiated contract. The initial setup of a requested service, including the negotiation and router set-up, can be a cumbersome and lengthy process. If there are any changes in the traffic, such as Internet protocol address changes, then the negotiated connections are broken and can take time and manual effort to re-establish.

As more service providers look to add voice and video content to their broadband networks, typically through the use of outside content providers, the need for a committed QoS level to provide a good customer experience is increasing. Currently, service providers can only control the QoS in their own networks. These providers can negotiate QoS contracts with other providers, but this has proven to be a cumbersome process. It would be desirable to implement an easy to use, standard process for negotiating and transmitting QoS information across multiple networks.

SUMMARY

Exemplary embodiments relate to methods, systems, and computer program products for providing quality of service brokering in a network. Methods include receiving a data packet at a router in an Internet protocol (IP) network. The data packet includes a data packet QoS class and a data packet destination. A storage mechanism that includes possible routes to the data packet destination at the data packet QoS class is accessed. One of the possible routes is selected. The data packet is transmitted along the selected route to the data packet destination.

Systems for providing quality of service brokering in a network include an input device on a router in an IP network and a processor in communication with the input device. The input device receives a data packet. The data packet includes a data packet QoS class and a data packet destination. The processor includes computer instructions for facilitating accessing a storage mechanism. The storage mechanism stores possible routes to the data packet destination at the data packet QoS class. One of the possible routes is selected and the data packet is transmitted along the selected route to the data packet destination.

Computer program products for a scheduler for providing quality of service brokering in a network include a storage medium readable by a processing circuit and storing instructions for execution by the processing circuit for facilitating a method. The method includes receiving a data packet at a router in an Internet protocol (IP) network. The data packet includes a data packet QoS class and a data packet destination. A storage mechanism that includes possible routes to the data packet destination at the data packet QoS class is accessed. One of the possible routes is selected. The data packet is transmitted along the selected route to the data packet destination.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Routers on the Internet already communicate routing path updates via the Border Gateway Protocol (BGP). This is a well known, standardized protocol for performing inter-domain routing in transmission-control protocol/Internet protocol (TCP/IP) networks. BGP is an exterior gateway protocol (EGP) that supports routing between multiple autonomous system or domains and exchanges routing and accessibility information with other BGP systems. Many current routers support the BGP protocol. Part of the BGP standard is the notion of BGP communities. These are groups of BGP speaking routers or IP addresses that can be treated as one BGP entity by a router for the purposes of applying polices. BGP communities are already used to create Multi Protocol Label Switching (MPLS) BGP virtual private networks (VPNs) per IETF RFC 2547.

Exemplary embodiments create a group of BGP community addresses that will map to specific quality of service (QoS) classes in a standardized way so that these classes have global significance across different networks and different carriers. A data field is added to the BGP header to indicate that "provider x" has "y amount" of bandwidth available in community "abc." This information is stored (e.g, in a storage mechanism), along with other BGP information, at the BGP routers.

In exemplary embodiments, carriers create a separate MPLS tunnel on their networks for each QoS class/BGP community using RSVP so that the bandwidth allocation can be monitored. RSVP provides the mechanism to record the amount of bandwidth requested. In addition, each carrier publishes a price list including the classes available and the price per unit of bandwidth. In exemplary embodiments, BGP accounting, already implemented on most BGP routers, is utilized to provide the traffic source and usage information for billing purposes.

Figure 1:
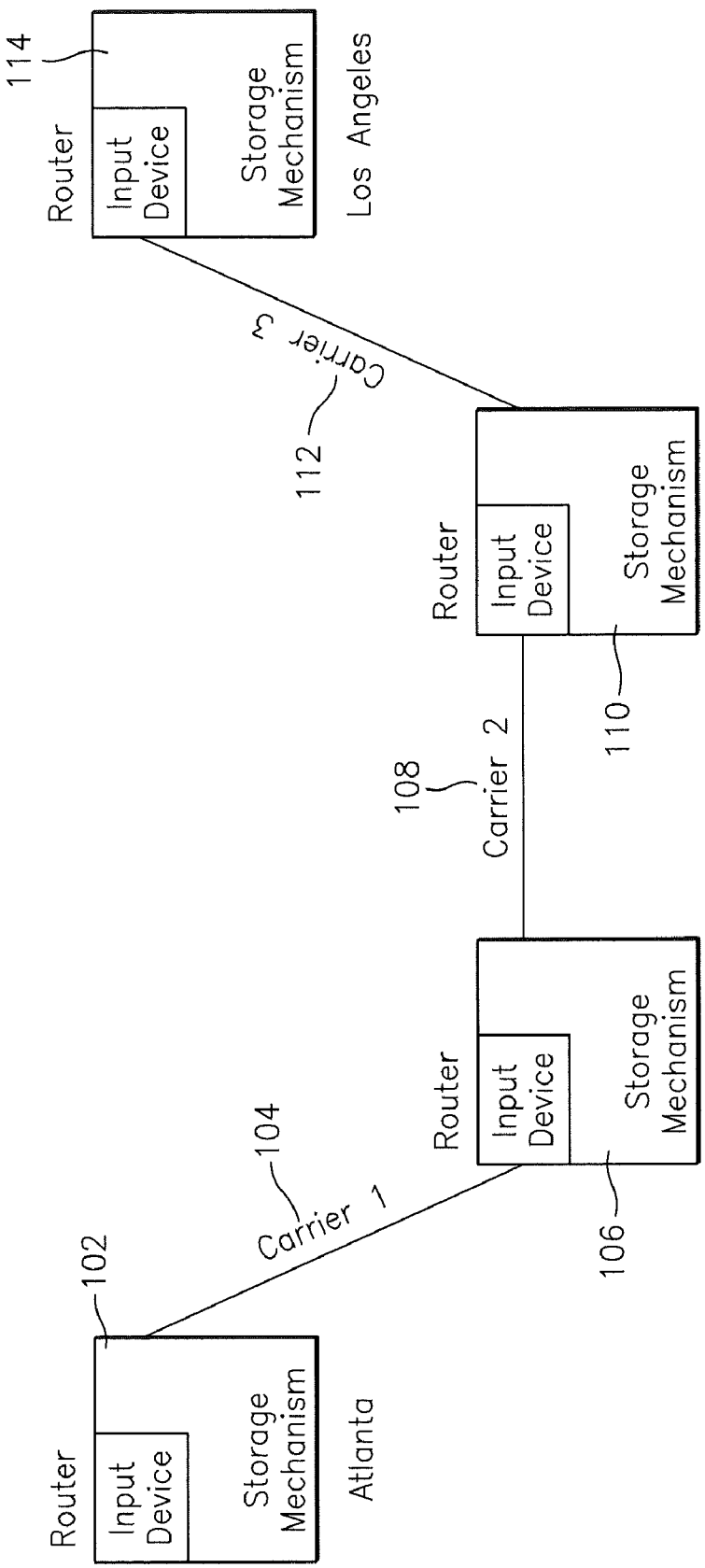
FIG. 1 is a block diagram of a system for providing quality of service brokering in a network that may be implemented by exemplary embodiments.

FIG. 1 is a block diagram of a system for providing QoS brokering in a network that may be implemented by exemplary embodiments. A customer may ask a service provider to provide a communication path of a specified bandwidth between Atlanta and Los Angeles. In addition, the customer may specify a particular QoS level that is required. In exemplary embodiments, the QoS level (or class) will map to a BGP community (in this example community "625"). The service provider negotiates with carrier one 104, carrier two 108 and carrier three 112 to provide the specified bandwidth at the particular QoS level that is required by the customer. As described below with reference to FIG. 2, the negotiation may be performed manually and/or automatically via a computer. Once the negotiations and setup are complete, the string "625" is added to the BGP header for all traffic (e.g., data packets) from the customer originating from the router 102 in Atlanta and being sent to the router 114 in Los Angeles. When the routers along the path (e.g., router 102, router 106, router 110, and router 114) see the string "625" in a BGP header for a data packet they know what QoS to provide for the data packet. In exemplary embodiments, the routers are BGP routers and they include an input device for receiving a data packet and a storage mechanism for storing BGP routing information.

Figure 2:
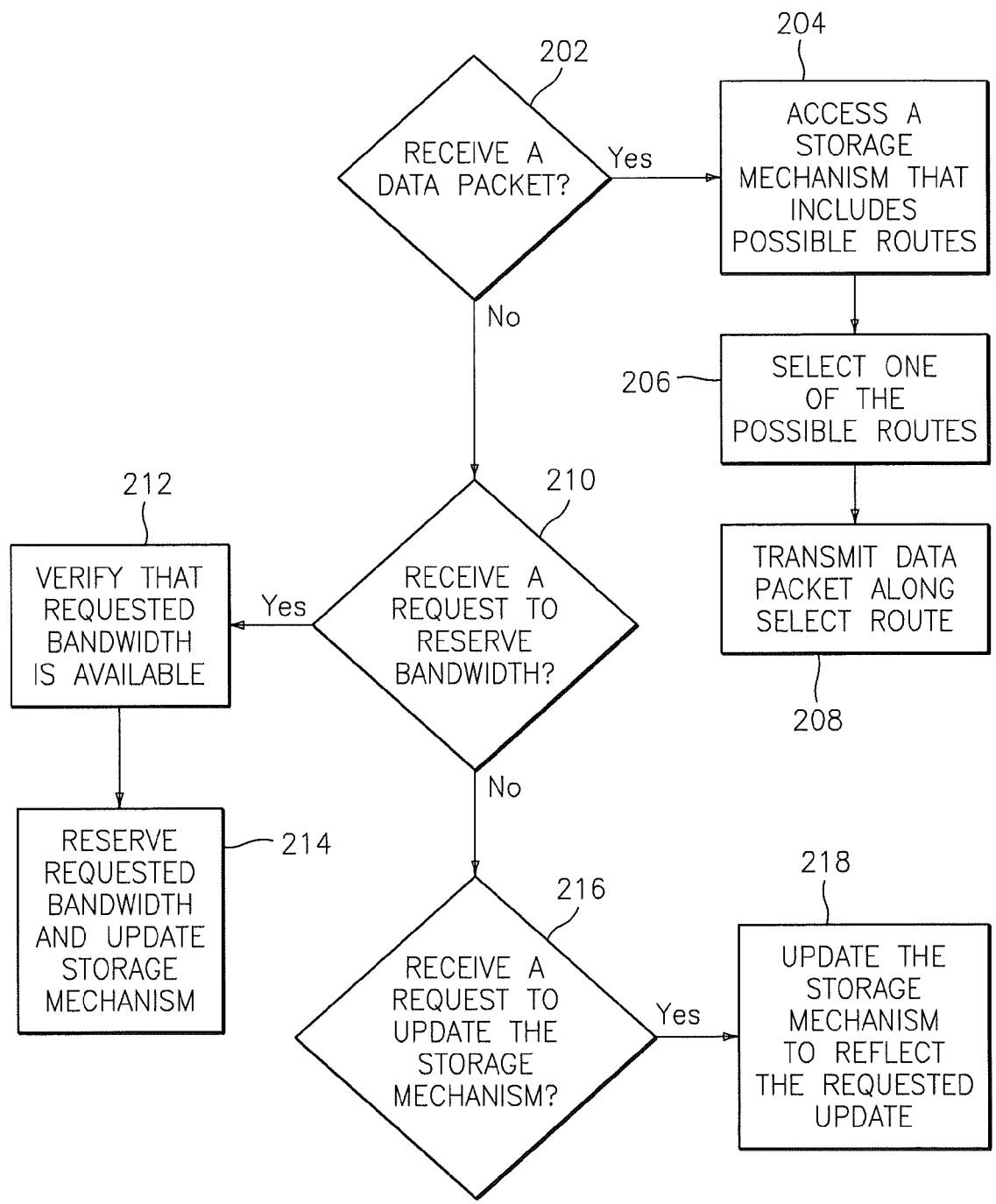
FIG. 2 is a flow diagram of an exemplary process for providing quality of service brokering in a network.

FIG. 2 is a flow diagram of an exemplary process for providing QoS brokering in a network. It could be performed at any of the routers depicted in FIG. 1. At block 202, it is determined if a router has received a data packet. If the router has received a data packet, then block 204 is performed to access a storage mechanism that includes possible routes between the router and a data packet destination (e.g, a router and a switch) specified in the data packet. Also specified by the data packet (e.g., in the header) is a QoS for the data packet (e.g, specified as a BGP community address). At block 206, one of the possible routes for the data packet is selected from the possible routes contained in the storage mechanism. At block 208, the data packet is transmitted along the selected route to the data packet destination at the specified QoS.

In exemplary embodiments, the data packet also includes a data packet customer identifier which may be utilized to select one of the possible routes. (e.g., only select a route that has bandwidth that has been reserved for the customer). Alternatively, or in addition, the customer identifier may be utilized to perform accounting functions such as billing the customer for the bandwidth utilized when transmitting the data packet. In exemplary embodiments, the router keeps track of the bandwidth utilized by recording the customer identifier along with the bandwidth and QoS that was used by the data packet. The billing information may be stored at the router and periodically transmitted to a billing system, or it may be stored outside of the router. The BGP accounting records may be utilized to initiate the customer billing. Alternate embodiments include the routers specifying the available bandwidth (if any) for each of the possible routes at the QoS specified by the data packet. Selecting a route is responsive to there being available bandwidth at the specified QoS. In this manner, a carrier may sell excess or currently unused bandwidth on a first come first serve basis and as a result may have increased utilization. In addition, if bandwidth on the QoS specified isn't available, but bandwidth on a higher level QoS is available, the data packet may be routed via the higher QoS level (in some cases at the same price as the requested QoS).

The data packet may be received via a first carrier and transmitted via a second carrier. By utilizing an additional field in the BGP header, the QoS class associated with the data packet may be universally known by multiple carriers across multiple networks. For example, referring to FIG. 1, a service provider may have negotiated contracts, including bandwidth and QoS requirements with carrier one 104, carrier two 108 and carrier three 112. When a data packet is received at an input device on router 102, it includes a BGP community in the heading (e.g., "625) which indicates the required QoS to be associated with the data packet. When router 102 receives the data packet it knows, based on the BGP community (e.g., by looking up the QoS that corresponds to the BGP community in a storage mechanism on the router), which QoS to apply to the data packet.

Similarly, when the data packet is received at an input device on router 106, the router 106 knows which QoS to apply to the data packet based on the BGP community of "625" in the heading and the common definition of what QoS should be applied to community "625." Router 102 and router 106 may be in different networks (including IP networks) and be managed by different carriers. The common definition of the QoS indicated by a BGP community of "625" allows the routers to quickly determine the correct QoS for each of the data packets for inter-carrier and inter-network data packets.

Referring to FIG. 2, if it is determined at block 202 that the router has not received a data packet, then block 210 is performed. At block 210, it is determined if a request to reserve bandwidth has been received at the router. If a request to reserve bandwidth has been received at the router, then block 212 is performed. The request is from a customer (e.g., a service provider acting on behalf of a end customer, and an end customer) and includes a requested destination and a requested QoS class (e.g, specified as a BGP community). At block 212, a check is made (e.g., by accessing the storage mechanism on the router or a storage mechanism in some other location) to verify that the requested bandwidth is available at the requested QoS class. At block 214, the requested bandwidth at the requested QoS class is reserved, it if is available as determined at block 212. The reservation of the bandwidth is recorded in the storage mechanism.

The processing described in reference to blocks 210 through 214 may be performed manually and/or in an automated fashion for each of the routers depicted in FIG. 1. In response to the request from the customer for a specified bandwidth at a particular QoS level, the service provider will ask each carrier along the route if they have the required bandwidth at the requested QoS. Referring to FIG. 1, the service provider may request, from carrier one 104, 25 megabytes (MBs) of bandwidth in a "625" community class between router 102 and router 106. This inquiry about availability may be handled at the router 102 based on information stored in the storage mechanism or elsewhere. Alternatively, carrier one 104 and other carriers may publish available bandwidth and QoS so that a service provider can determine network availability.

Once it is determined that the requested bandwidth, at the requested QoS is available between router 102 and router 106, the requested bandwidth at the requested QoS is reserved. In exemplary embodiments, the reservation is performed by updating the storage mechanism on the router to reflect the reservation. In embodiments where a list of available bandwidth and QoS is published by the carriers, the list would be updated as a result of the reservation.

Referring to FIG. 1, the service provider may then request, from carrier two 108, 25 megabytes (MBs) of bandwidth in a "625" community class between router 106 and router 110. This inquiry about availability may be handled at the router 106 based on information stored in the storage mechanism or elsewhere. Alternatively, carrier two 108 and other carriers may publish available bandwidth and QoS so that a service provider can determine network availability. The reservation process continues until the service provider has reserved the bandwidth required at the QoS required for the customer. As used herein, the terms service provider and customer may be used interchangeably. A service provider may be considered to be the customer for the carriers, and the service provider may be reserving the bandwidth for a customer of the service provider. In addition, a customer may be reserving the bandwidth for its own use and may or may not be considered a service provider.

In the example depicted herein, the same amount of bandwidth and the same community class are reserved from the Atlanta router 102 to the Los Angeles router 114. In exemplary embodiments, the amount of bandwidth and the BGP community classes may differ between routers for the same customer. For example, a bandwidth of 25 MBs in a "625" community class may be reserved on carrier one 104 between router 102 and router 106, and a bandwidth of 50 MBs in a "999" community class may be reserved on carrier two 108 between router 106 and 110. The differences may be due to a variety of factors including bandwidth availability and router capability.

In other exemplary embodiments, the service provider (or customer) may be required to authorize the reservation of the bandwidth before the reservation occurs. This may be performed by transmitting a fee for each of the possible route(s) that fit the bandwidth and QoS requirements and asking the service provider (or customer) to select the route that should be reserved. In response to receiving an authorization from the service provider (or customer), the bandwidth is reserved.

If it has been determined at block 210, that a request to reserve bandwidth has not been received at the router, then block 216 is performed. At block 216 it is determined if a request to update the storage mechanism on the router has been received. If a request to update the storage mechanism on the router has been received, then block 218 is performed and the storage mechanism is updated to reflect the requested update. Updates may include, adding a new route, deleting an existing route and updating an existing route (e.g., adding more bandwidth and adding a different QoS). In exemplary embodiments, the update information is received at the router via a BGP community address that specifies a QoS class.

Exemplary embodiments may be utilized to implement an easy to use and standard process for negotiating and transmitting quality of service information across multiple networks and/or multiple carriers. In addition, exemplary embodiments may be utilized to transmit data packets across multiple networks and/or multiple carriers in an efficient manner.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents maybe substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A computer implemented method for providing quality of service (QoS) brokering in a network, the method comprising:
   receiving at a router in an Internet protocol (IP) network a request to reserve a requested bandwidth, the receiving from a customer via a first carrier and including a requested destination in the IP network and a requested QoS class;
   verifying in a computer system that the requested bandwidth at the requested QoS class is available in the IP network between the router and the requested destination; and
   reserving in the IP network the requested bandwidth at the requested QoS class between the router and the requested destination for the customer, the reserving including updating a storage mechanism to reflect the customer, the requested QoS class and the requested destination, wherein the reserving is performed in response to the requested bandwidth at the requested QoS class being available in the IP network between the router and the requested destination, and all or a portion of the reserved bandwidth is provided by a second carrier.

2. The method of claim 1, wherein the requested QoS class is specified as a Border Gateway Protocol (BGP) community address that corresponds to the requested QoS class.

3. The method of claim 1, further comprising:
   transmitting a request for authorization from the customer to reserve the requested bandwidth, the request for authorization including a fee for the requested bandwidth at the requested QoS class;
   receiving the authorization; and
   performing the reserving in response to receiving the authorization.

4. The method of claim 1, further comprising initiating a customer bill for the reserved bandwidth.

5. The method of claim 4, wherein the initiating a customer bill utilizes BGP accounting records.

6. The method of claim 4, wherein the bill contains information that is stored at the router and transmitted to a billing system on a predetermined interval.

7. The method of claim 1, wherein the receiving is from a second IP network.

8. The method of claim 1, further comprising:
   receiving a data packet at the router, the data packet including a data packet QoS class and a data packet destination;

accessing the storage mechanism to determine possible routes to the data packet destination at the data packet QoS class;

selecting one of the possible routes;

accessing the storage mechanism to verify that the data packet is from a customer who has reserved the bandwidth at the data packet QoS class to the data packet destination; and transmitting the data packet along the selected route to the data packet destination in response to the customer having reserved the bandwidth.

9. The method of claim 8, wherein the storage mechanism further includes available bandwidth for each of the possible routes at the data packet QoS class, and the selecting includes verifying that the selected route has enough bandwidth at the data packet QoS class for processing the data packet.

10. The method of claim 8, further comprising:

receiving a requested update to the storage mechanism including one or more of a new possible route, a deletion of one of the possible routes and an update to one of the possible routes; and updating the storage mechanism to reflect the requested update.

11. The method of claim 10, wherein the update is received via a BGP header record which includes a community address that specifies an updated QoS class.

12. The method of claim 8, wherein the data packet destination includes at least one of a router and a switch.

13. The method of claim 1, wherein the requested destination includes at least one of a router and a switch.

14. A system for providing quality of service brokering, the system comprising:

an input device on a router in an IP network for receiving request to reserve a requested bandwidth, the receiving from a customer via a first carrier and including a requested destination in the IP network and a requested QoS class; and a processor including computer instructions for facilitating:

verifying that the requested bandwidth at the requested QoS class is available in the IP network between the router and the requested destination; and reserving in the IP network the requested bandwidth at the requested QoS class between the router and the requested destination for the customer, the reserving including updating a storage mechanism to reflect the customer, the requested QoS class and the requested destination, wherein the reserving is performed in response to the requested bandwidth at the requested QoS class being available in the IP network between the router and the requested destination, and all or a portion of the reserved bandwidth is provided by a second carrier.

15. The system of claim 14, wherein the requested QoS class is specified as a Border Gateway Protocol (BGP) community address that corresponds to the requested QoS class.

16. The system of claim 14, wherein the computer instructions further facilitate:

transmitting a request for authorization from the customer to reserve the requested bandwidth, the request for authorization including a fee for the requested bandwidth at the requested QoS class;

receiving the authorization; and performing the reserving in response to receiving the authorization.

17. The system of claim 14, wherein the requested destination includes at least one of a router and a switch.

18. A computer program product for providing quality of service brokering in a network, the computer program product comprising:

a storage medium readable by a processing circuit and storing instructions for execution by the processing circuit for facilitating a method comprising:

receiving at a router in an Internet protocol (IP) network a request to reserve a requested bandwidth, the receiving from a customer via a first carrier and including a requested destination in the IP network and a requested QoS class;

verifying in a computer system that the requested bandwidth at the requested QoS class is available in the IP network between the router and the requested destination; and reserving in the IP network the requested bandwidth at the requested QoS class between the router and the requested destination for the customer, the reserving including updating a storage mechanism to reflect the customer, the requested QoS class and the requested destination, wherein the reserving is performed in response to the requested bandwidth at the requested QoS class being available in the IP network between the router and the requested destination, and all or a portion of the reserved bandwidth is provided by a second carrier.

19. The computer program product of claim 18, wherein the requested QoS class is specified as a Border Gateway Protocol (BGP) community address that corresponds to the requested QoS class.

20. The computer program product of claim 18, wherein the method further comprises:

receiving a data packet at the router, the data packet including a data packet QoS class and a data packet destination;

accessing the storage mechanism to determine possible routes to the data packet destination at the data packet QoS class;

selecting one of the possible routes;

accessing the storage mechanism to verify that the data packet is from a customer who has reserved the bandwidth at the data packet QoS class to the data packet destination; and transmitting the data packet along the selected route to the data packet destination in response to the customer having reserved the bandwidth.

* * * * *